US011985038B2

(12) United States Patent
Yi et al.

(10) Patent No.: US 11,985,038 B2
(45) Date of Patent: May 14, 2024

(54) SELECTING FORWARDER IN A NETWORK INSTALLATION

(71) Applicant: Hewlett Packard Enterprise Development LP, Houston, TX (US)

(72) Inventors: Liya Yi, Beijing (CN); Zhijun Ren, Beijing (CN); Chunfeng Wang, Beijing (CN); Jishi Wang, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 164 days.

(21) Appl. No.: 17/528,334

(22) Filed: Nov. 17, 2021

(65) Prior Publication Data

US 2023/0155898 A1    May 18, 2023

(51) Int. Cl.
*H04L 41/14* (2022.01)
*H04L 61/4511* (2022.01)
*G06F 8/61* (2018.01)

(52) U.S. Cl.
CPC .......... *H04L 41/14* (2013.01); *H04L 61/4511* (2022.05); *G06F 8/61* (2013.01)

(58) Field of Classification Search
CPC ..... H04L 41/14; H04L 43/08; H04L 61/4511; H04L 61/4541
See application file for complete search history.

(56) References Cited

U.S. PATENT DOCUMENTS

| | | | |
|---|---|---|---|
| 7,885,233 B2 | 2/2011 | Nagarajan et al. | |
| 7,961,727 B2 | 6/2011 | Duncan et al. | |
| 8,902,794 B2 | 12/2014 | Shah et al. | |
| 8,988,984 B2 | 3/2015 | Marques et al. | |
| 9,019,814 B1 | 4/2015 | Mohanty et al. | |
| 9,088,517 B2 | 7/2015 | Sajassi et al. | |
| 9,143,396 B2 | 9/2015 | Dong et al. | |
| 9,667,442 B2 | 5/2017 | Shao et al. | |
| 10,484,278 B2 | 11/2019 | Lopez | |
| 2010/0172258 A1* | 7/2010 | Yang | H04L 45/00 370/252 |
| 2011/0004913 A1 | 1/2011 | Nagarajan et al. | |
| 2022/0173509 A1* | 6/2022 | Zanaty | H04B 17/345 |

* cited by examiner

*Primary Examiner* — Gil H. Lee
(74) *Attorney, Agent, or Firm* — Hewlett Packard Enterprise Patent Department

(57) ABSTRACT

Examples described herein relate to a selection of a network device in a network installation for a forwarder operation. Selection may include computing a performance score based on a set of performance parameters. Broadcasting the computed performance score to other network devices. Receiving performance scores from the other network devices. Comparing the received performance scores with the computed performance score. Continuing in the forwarder mode based on a determination that the received performance scores are less than its computed performance score. Receiving multicast Domain Name Service (mDNS) packets from one or more client devices. Sending the received mDNS packets to a central service.

12 Claims, 7 Drawing Sheets

SELECTING FORWARDER IN A NETWORK INSTALLATION

BACKGROUND

Zero-configuration networking (Zeroconf) may refer to a technique for creating an Internet Protocol (IP) network with limited or no manual intervention. Zeroconf may enable service discovery, address assignment, and hostname resolution for communication devices. Zeroconf may be achieved based on link-local multicast protocols. Certain approaches may provide Zeroconf based on a Multicast Domain Name Service (mDNS) protocol.

BRIEF DESCRIPTION OF THE DRAWINGS

One or more examples in the present disclosure are described in detail with reference to the following figures. The figures are provided for purposes of illustration only and merely depict typical or examples, wherein.

Figure 1:
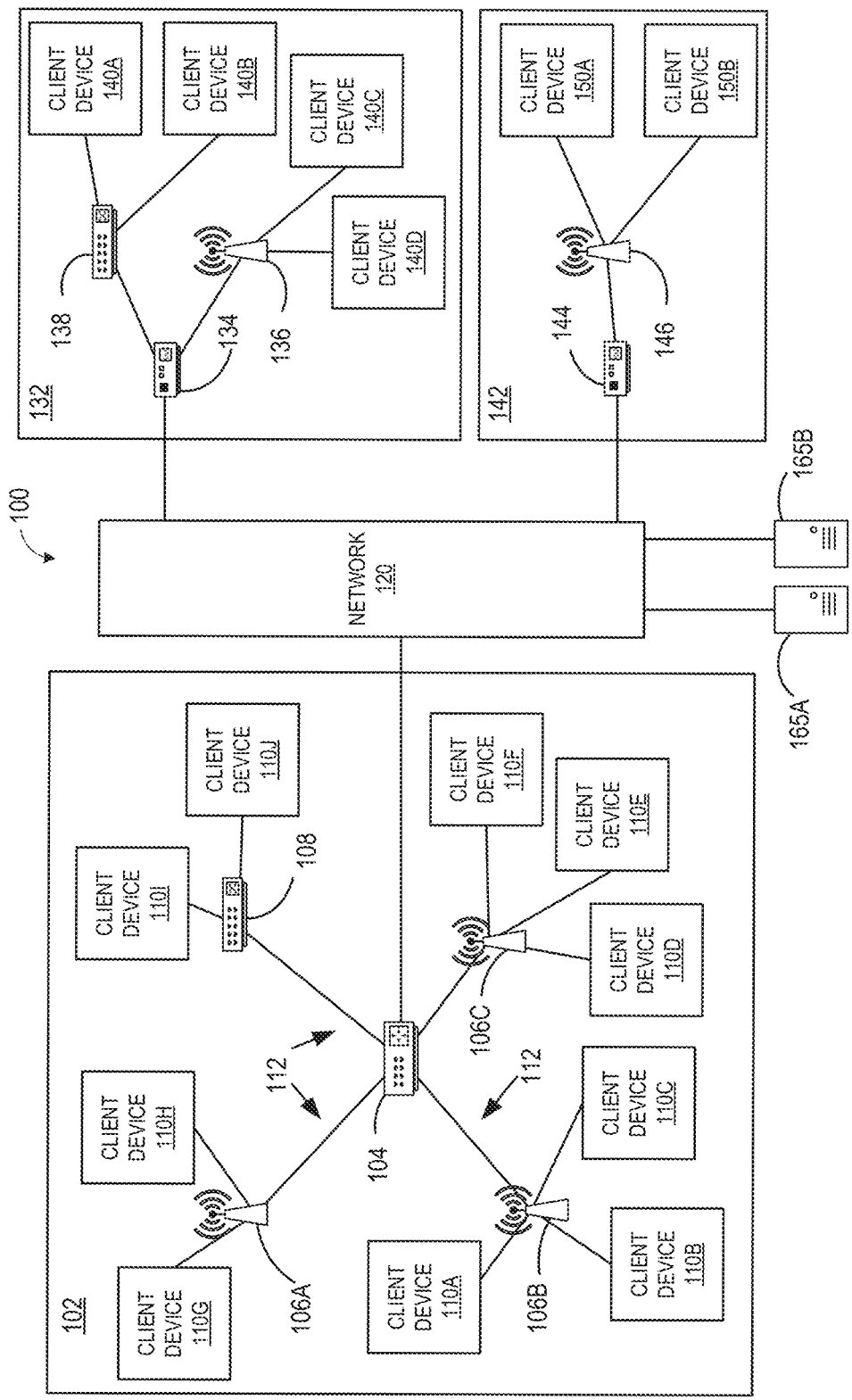
FIG. 1 illustrates an example network installation in which various examples presented herein may be implemented.

The figures are not exhaustive and do not limit the present disclosure to the precise form disclosed.

DETAILED DESCRIPTION

In a network, network devices, for example, access points may utilize Multicast Domain Name Service (mDNS) service for Zeroconf related communication. In certain universities, organizations, or enterprise networks, network devices may be connected to a network across Virtual Local Area Networks (VLANs). Devices on VLAN may not discover devices on another VLAN. Link-local multicast messages (e.g., mDNS packets) may be limited to travel within a VLAN and not across different VLANs. Thus, devices in one VLAN may not be able to discover devices/services in another VLAN. Therefore, a centralized database may be used to collect information related to services (e.g., distributed layer-two services) via mDNS packets. A network device may be selected from a VLAN to forward mDNS packets to the centralized database in order to limit flooding of the network with redundant or otherwise unnecessary mDNS packets from multiple network devices.

In some instances, a network device with the largest Media Access Control (MAC) address may be selected as a forwarder. However, a network device with the largest MAC address may not be the most efficient device in a network. Network device performance may intermittently degrade or deteriorate over time, which may affect a selected device's packet handling/forwarding capability. In some other instances, a network device may go down. That may result in delay or loss of information (e.g., mDNS packets). A network device that has gone down may take time to recover and to select another network device (e.g., backup device) for performing forwarding operation. Such delays may affect packet traffic in a network. In some other instances, a backup device selected by a primary forwarder may still exhibit poor performance that affects the forwarding of mDNS packets to a centralized database that may cause delay or interruption of services. In certain other instances, a network device selected as a forwarder may be part of multiple VLANs or operate as a forwarder for multiple VLANs. In such circumstances, a selected device may be overloaded with mDNS and/or data traffic resulting in poor performance.

In the present disclosure, exemplary techniques to select a forwarder, such as an access point, in a network with Zeroconf capability are proposed. A forwarder may be periodically selected from available network devices, so that a network device with relatively high performance may take up a forwarder role to communicate mDNS packets to a central service. For example, client device(s) connected to a network may send mDNS packets to discover services or to resolve hostnames to Internet Protocol (IP) addresses. A forwarder can be selected for a VLAN, such that it sends the received mDNS packet received over the VLAN to a central service.

In accordance with some examples, to aid in the selection of a network device to operate in forwarder mode, selectable network devices may be configured to compute their performance score. Initially, multiple selectable network devices in the network may be configured to operate in forwarder mode. Each selectable network device may communicate its computed performance score to other network devices in the network. The performance score may be broadcasted as an announcement in a custom Ethernet frame, such that other network devices receive the performance score. Each network device may compare its computed performance score with the received performance scores to determine its operational mode.

In some examples, a network device may modify its operational mode to a non-forwarder mode, in response to a determination that its computed performance score is less than two or more received performance scores (corresponding to two or more selectable network devices). In some examples, a selectable network device may continue its operation in forwarder mode, in response to a determination that the received performance scores are less than its computed performance score. In some examples, a network device may modify its operational mode to a backup-forwarder mode, in response to a determination that one of the received performance scores is higher than its performance score. In other words, a network device with a relatively high or highest performance score may take up the forwarder role and a network device with the second highest performance score may modify its operational mode to that of a backup-forwarder.

Further, network devices may compute their performance score periodically. A forwarder and a backup-forwarder may periodically broadcast or announce their performance scores to network devices not selected to operate in forwarder mode ("non-forwarders"). The non-forwarders may compare their performance score with performances scores received from the forwarder and backup-forwarder. The non-forwarders may determine if they are eligible for taking up the forwarder mode or backup-forwarder mode based on the latest performance scores. For example, a non-forwarder may determine that its latest performance score is greater than the performance score of a current forwarder/or a backup-forwarder. Accordingly, that network device may announce its performance score, so that it can take up the forwarder role, and the operational mode of the current forwarder can be demoted to a backup-forwarder or non-forwarder. The present disclosure provides an efficient selection technique, as network devices in a VLAN deployment participate in a selection process to take up roles while, limiting or eliminating dependency on other devices (i.e., devices that are not part of the selection process).

As will be appreciated, the proposed examples may facilitate the selection of a network device, such as an access point, for performing forwarder operations. A forwarder may receive mDNS packets from a client device and the forwarder may communicate those mDNS packets to a central service. The mDNS packets may correspond to a distributed layer-two related services. Other network devices can drop the mDNS packets that are received from the client so that packet traffic in the network can be reduced. Further, periodic computation and announcement of performance scores enable the dynamic selection of a forwarder during a particular selection cycle. During a subsequent selection cycle, another network device capable of efficiently performing forwarding operations as well as handling its data and management traffic can be selected. In some examples, the selection of a backup-forwarder may facilitate reduced downtime, as the backup-forwarder may take up the forwarder role when the forwarder goes down. In some other examples, two or more backup-forwarders may be selected for additional redundancy.

The following detailed description refers to the accompanying drawings. Wherever possible, the same reference numbers are used in the drawings and the following description to refer to the same or similar features. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

Before describing examples of the disclosed techniques in detail, it is useful to describe an example network installation with which these systems and methods might be implemented in various applications. FIG. 1 illustrates an example of a network installation 100 that may be implemented for an organization, such as a business, educational institution, governmental entity, healthcare facility, or other organization. This diagram illustrates an example of a configuration implemented with an organization having multiple users (or at least multiple client devices 110) and possibly one or more physical or geographical sites, for example, a primary site 102, and/or remote sites 132, 142. The primary site 102 and/or the remote sites 132, 142 are in communication with a network 120.

The primary site 102 may include a primary network, which can be, for example, an office network, home network, or other network installation. The primary site 102 may be a private network, such as a network that may include security and access controls to restrict access to authorized users of the private network. Authorized users may include, for example, employees of a company at the primary site 102, residents of a house, customers at a business, and so on. In the illustrated example, the primary site 102 is shown to include a control device 104 in communication with the network 120. The control device 104 may provide communication with the network 120 for the primary site 102, though it may not be the only point of communication with the network 120 for the primary site 102. A single control device 104 is illustrated but the primary site 102 may include multiple controllers and/or multiple communication points with network 120. In some examples, the control device 104 may communicate with the network 120 through a router (not shown). In other implementations, the control device 104 may provide router functionality to the devices in the primary site 102.

The control device 104 may be operable to configure and manage network devices, such as at the primary site 102, and may also manage network devices at the remote sites 132, 142. The control device 104 may be operable to configure and/or manage switches, routers, access points, and/or client devices connected to a network. The control device 104 may itself be, or provide the functionality of, an access point. In some examples, the control device 104 may be in communication with one or more switches 108 and/or Access Points (APs) 106A-106C. The AP may provide access to the network installation, which it is part of. In some examples, AP may include a digital device, a software, or a combination of both, which is communicatively coupled to the network installation 100. The switches 108 and the wireless APs 106A-106C may provide network connectivity to client devices 110A-110J. Using a connection to the switch 108 or one or more of the AP 106A-106C, one or more of the client devices 110A-110J may access network resources, including other devices on the (primary site 102) network and the network 120. Examples of client devices 110A-110J may include but are not limited to, desktop computers, laptop computers, servers, web servers, authentication servers, Authentication-Authorization-Accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, Personal Digital Assistants (PDAs), mobile phones, smartphones, smart terminals, dumb terminals, virtual terminals, video game consoles, virtual assistants, Internet of Things (IoT) devices, and the like.

Within the primary site 102, the switch 108 is included as one example of a point of access to the network established in primary site 102 for wired client devices 110I and 110J, for example. The client devices 110I and 110J may connect to the switch 108 and through the switch 108, may be able to access other devices within the network installation 100. The client devices 110I and 110J may also be able to access the network 120, through the switch 108. The client devices 110I and 110J may communicate with the switch 108 over a wired connection 112. In the illustrated example, the switch 108 may communicate with the control device 104 over a wired connection 112, though this connection may also be wireless, in some examples.

The APs 106A-106C are included as another example of a point of access to the network established in primary site 102 for client devices 110A-110H. Each of APs 106A-106C may be a combination of hardware, software, and/or firmware that is configured to provide wireless network connectivity to client devices 110A-110H. In the illustrated example, the APs 106A-106C can be managed and configured by the control device 104. The APs 106A-106C may communicate with the control device 104 and the network 120 over connections 112, which may be either wired or wireless interfaces.

The network installation 100 may include one or more remote sites 132. A remote site 132 may be located in a different physical or geographical location from the primary site 102. In some cases, the remote site 132 may be in the same geographical location, or possibly the same building, as the primary site 102, but lack a direct connection to the network located within the primary site 102. Instead, the remote site 132 may utilize a connection over a different network, e.g., the network 120. The remote site 132 such as the one illustrated in FIG. 1 may be, for example, a satellite office, another floor, or suite in a building, and so on. The remote site 132 may include a gateway device 134 for communicating with the network 120. The gateway device 134 may be a router, a digital-to-analog modem, a cable modem, a Digital Subscriber Line (DSL) modem, or some other network device configured to communicate to the network 120. The remote site 132 may also include a switch 138 and/or an AP 136 in communication with the gateway device 134 over either wired or wireless connections. The switch 138 and the AP 136 may provide connectivity to the network for client devices 140A-140D.

In various examples described herein, the remote site 132 may be in direct communication with the primary site 102, such that client devices 140A-140D at the remote site 132 access the network resources at the primary site 102 as if these client devices 140A-140D were located at the primary site 102. In such examples, the remote site 132 may be managed by the control device 104 at the primary site 102, and the control device 104 may provide the necessary connectivity, security, and accessibility that enable the remote site 132's communication with the primary site 102. Once connected to the primary site 102, the remote site 132 may function as a part of a private network provided by the primary site 102.

In various examples, the network installation 100 may include one or more remote sites 142, comprising a gateway device 144 for communicating with the network 120 and a wireless AP 146, by which client devices 150A, 150B access the network 120. Such a remote site 142 may represent, for example, an individual employee's home or a temporary remote office. The remote site 142 may also be in communication with the primary site 102, such that the client devices 150A, 150B at remote site 142 access the network resources at the primary site 102 as if these client devices 150A, 150B were located at the primary site 102. The remote site 142 may be managed by the control device 104 at the primary site 102 to make this transparency possible. Once connected to the primary site 102, the remote site 142 may function as a part of a private network provided by the primary site 102.

The network 120 may be a public or private network, such as the Internet, or another communication network to allow connectivity among the various sites 102, 132 to 142 as well as access to content servers 165A, 16BB. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network installation 100 but that facilitate communication between the various parts of the network installation 100, and between the network installation 100 and other network-connected entities. The content servers 165A, 165B may be part of the network 120 or disposed outside of the network 120. The content servers 165A, 165B may include various providers of multimedia downloadable and/or streaming content, including audio, video, graphical, and/or text content, or any combination thereof. Examples of content servers 165A, 165B may include, but are not limited to, web servers, streaming radio and video providers, and cable and satellite television providers. The client devices 110A-110J, 140A-140D, 150A-150B may request and access the multimedia content provided by the content servers 165A, 165B.

In some examples of network installation 100, the primary site 102 may be a VLAN deployment and the APs 106A-106C may be capable of operating as forwarders. The term forwarder as used herein may refer to the capability of an AP to communicate mDNS packets to a central service (not shown). The central service may comprise a centralized database that receives information corresponding one or more services associated with the network installation. For example, the services may be distributed layer-two services communicated via mDNS packets reported by AP(s). In accordance with aspects of the present disclosure, examples for dynamic selection of an AP for operation in forwarder mode is discussed. For a given time interval, one AP with a high-performance metric may operate as a forwarder. In a subsequent instance, the same AP may continue in forwarder mode, or another AP may be selected to operate in forwarder mode based on the latest performance metrics.

In some examples, for a network installation, such as the network installation 100, an AP may be selected for each VLAN for forwarder operation. For example, the primary site 102 may be a first VLAN VLAN-1, the remote site 132 may be a second VLAN VLAN-2, and the remote site 142 may be a third VLAN VLAN-3. In some further examples, the primary site 102 may have one AP operating in forwarder mode, one AP operating in backup-forwarder mode, and other APs operating in non-forwarder mode.

In some examples, initially, the APs 106A-106C may operate in a forwarder mode. Further, APs 106A-106C may compute performance scores based on a set of performance parameters. The set of performance parameters may include processing power of device, stability of device, hardware capability, or similar parameters. Each AP 106A-106C may broadcast their computed performance score to other network devices of the plurality of network devices in the VLAN deployment (e.g., the first VLAN VLAN-1). Each AP 106A, 106B, and 106C may receive performance scores broadcasted by the other APs. For example, AP 106A may receive performance scores of APs 106B and 106C. The APs 106A-106C may compare the received performance scores with their computed performance score. An AP may continue to operate in forwarder mode, based on the determination that the received performance scores are less than its computed performance score. For example, the AP 106A may continue operation in forwarder mode, and other APs 106B and 106C may demote to non-forwarder or a backup-forwarder mode. The techniques for the selection of a forwarder are further elaborated in the following examples.

Figure 2:
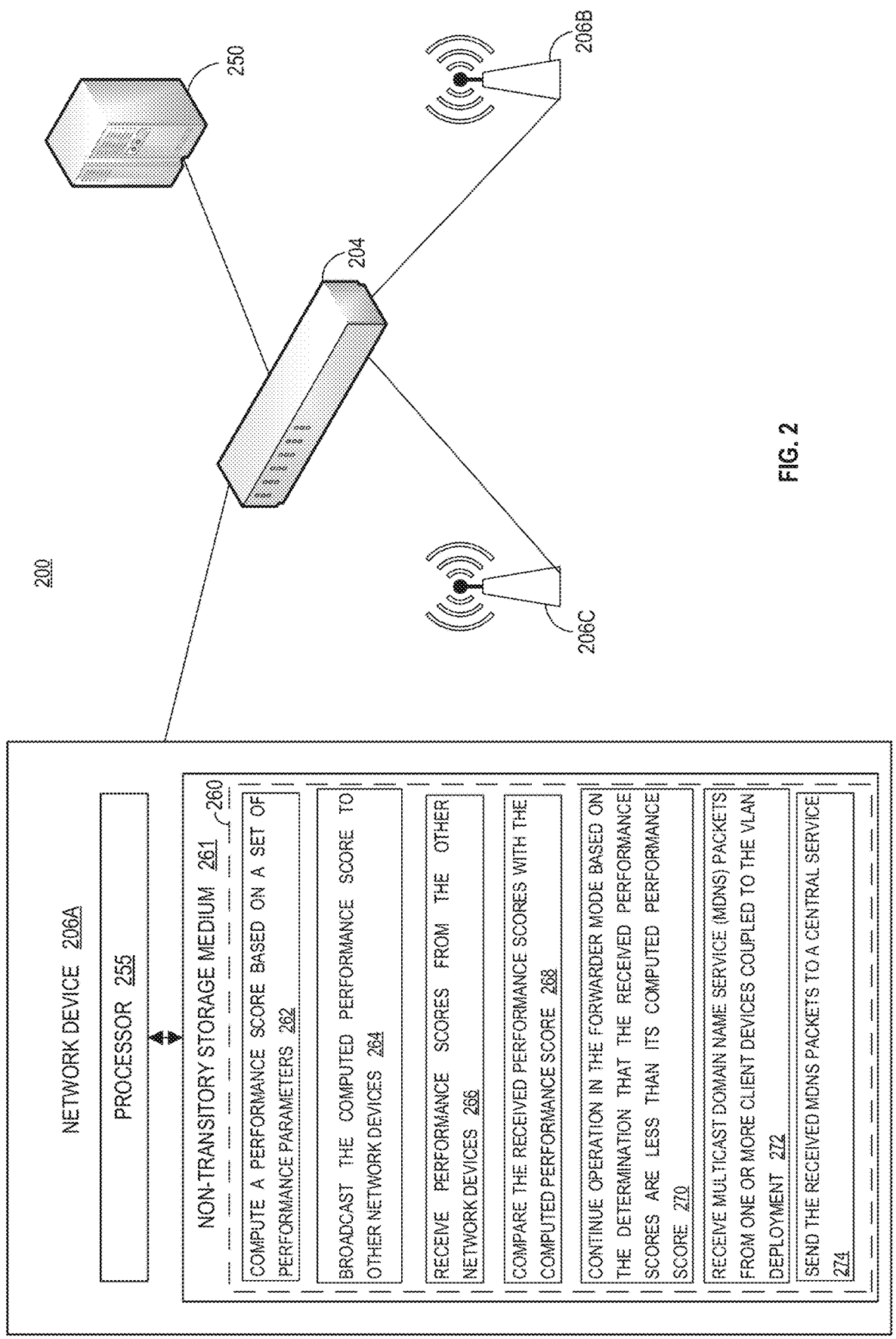
FIG. 2 depicts a schematic view of a network device deployed in a network installation, according to some examples of the present disclosure.

FIG. 2 illustrates a schematic view of a network device deployed in a network installation 200. The disclosed network installation 200 may be capable of a Zero-network installation (Zeroconf) service. The illustrative example network installation is simplified for the purposes of discussion only and includes a switch 204, three network devices 206A-206C, and a central service 250. In scalable enterprise local area networks, multiple additional network devices can be deployed. The network devices may be communicatively coupled by a wired or wireless interface.

The wired interface may be based on an Institute of Electrical and Electronics Engineers (IEEE) 802.3 standard. Similarly, the wireless interface may be based on an IEEE 802.11 standard.

In some examples, the network installation 200 may be a VLAN deployment. The VLAN generally may refer to a layer-2 network that can be logically partitioned to create multiple broadcast domains. The broadcast domains can be mutually separated such that packets from one domain can traverse within that domain. For example, a broadcast or multicast message originated within a VLAN (e.g., the primary site 102 of FIG. 1) may not be forwarded to other devices that belong to a different VLAN. In some examples, certain devices that are physically located in proximity may be logically separated from each other based on VLAN deployment.

In the illustrative example of FIG. 2, the network devices 206A-206C are communicatively coupled to the switch 204. The network devices 206A-206C are capable of sending/receiving any multicast and/or broadcast message(s). The switch 204 may receive a multicast message from any of the network devices 206A-206C connected to it and can be capable of forwarding them to the rest of the network devices within the VLAN domain. As the network devices 206A-206C can be coupled through the switch 204, multicast message(s) received on one of the ports of the switch 204 can be duplicated. The duplicated copies can be forwarded via port(s) to other network devices that are configured within the same VLAN as that of the port through which the original multicast message is received.

Illustrative examples of FIG. 2 are discussed with reference to a first network device 206A. In some examples, the first network device 206A may include a processor 255 and a non-transitory storage medium 261. The processor 255 may include a hardware processing resource, such as one or more Central Processing Units (CPUs), semiconductor-based microprocessors, and/or other hardware devices suitable for retrieval and execution of instructions 260 stored in the non-transitory storage medium 261. The processor may fetch, decode, and execute instructions 260 (e.g., instructions 262-274), for forwarder selection. As an alternative or in addition to retrieving and executing instructions, the processor 255 may include one or more electronic circuits that include electronic components for performing the functionality of one or more instructions, such as a field-programmable gate array (FPGA), application-specific integrated circuit (ASIC), or other electronic circuits.

The non-transitory storage medium 261 may be any electronic, magnetic, optical, or other physical storage device that contains or stores executable instructions. Thus, a machine-readable storage medium may be, for example, Random Access Memory (RAM), non-volatile RAM (NVRAM), an Electrically Erasable Programmable Read-Only Memory (EEPROM), a storage device, an optical disc, and the like. In some examples, a machine-readable storage medium may be a non-transitory storage medium, where the term "non-transitory" does not encompass transitory propagating signals.

Initially, the plurality of network devices 206A-206C may operate in a forwarder mode. For example, the plurality of network devices 206A-206C may be set to send mDNS messages to the central service 250. Herein, the term "message" may include a packet, a stream (e.g., a sequence of packets), a frame, a grouped information, or other sequences of bits with a defined format. An "mDNS packet" may be based on mDNS protocol as defined in Internet Engineering Task Force (IETF) Request for Comments (RFC) 6762.

The processor 255 may fetch, decode, and execute instructions 262 that cause the processor 255 to compute a performance score based on a set of performance parameters. The performance score may correspond to an operational performance of network device. In the example provided in Table-1, the performance score of each of the network devices may be computed based on a set of performance parameters listed. The network devices 206A-206C are identified in the first row and the computed performance scores are represented in the last row of Table-1.

TABLE 1

Example performance parameters and performance score

| Parameter | Network Device 206A | Network Device 206B | Network Device 206C |
| --- | --- | --- | --- |
| IP Address | 84:d4:7e:c6: 60:6e | ac:a3:1e:cd: 79:1a | 90:4c:81:cf: 3d:e0 |
| Available processing power | 80% | 10% | 20% |
| Device Score | 80 | 60 | 80 |
| Device Stability | 3 | 20 | 10 |
| Balance value | 0 | 0 | 0 |
| MAC value | 84 | 0xac | 90 |
| Perf. Score (PS) | 60.8 | 41.6 | 45.5 |

In some examples, the performance score can be computed based on a set of performance parameters, such as an available processing power (i.e., free processing power that is available), a device score, a stability of the device, a balance function offered by the device, and a MAC value. In some other examples, one or more of the aforementioned parameters and/or additional parameters may be utilized to determine the performance score.

For the ongoing example, the available processing power may correspond to a percentage of total processing power that may be freed for performing forwarder operation. In some examples, mDNS packets may be sent periodically and can occupy processing resources and communication resources between a network device and the central service 250. For example, a network device occupied with downloading configurations or handling clients' traffic may have limited processing power. Further, a device score may be based on a hardware configuration and can be determined based on a network device series or configuration. For example, a network device with a faster processor and a larger or faster memory may have a higher device score. In some examples, a device score may be preset based on a hardware configuration.

The device stability may be determined based on a consistency of a network device connection with the central service 250. For example, a network device that exhibits shorter downtime in its connection with the central service 250 can have a higher value. In some examples, historical downtime data may be used to determine the device's stability. Further, the balance value may correspond to a VLAN balance. For example, a network device that is part of one VLAN may be selected for dedicated mDNS packet transmission. In other instances, a network device may be part of two or more VLANs and may also work as a forwarder in one VLAN. Such network devices may have a poor balance score when evaluated because one device is performing a dedicated function and the other is performing three or more functions simultaneously. Thus, network devices that are unique to a dedicated VLAN and/or do not perform any forwarder role in other VLANs may obtain a relatively higher balance score during computation, than network device(s) performing more functions. The MAC value may be derived from a MAC address of a network device. The MAC value may be obtained from the first byte of the MAC address, which can be converted to a numerical value. In some instances, where the network devices have similar performance parameters, the MAC value may be used as a differentiator to choose which of the similar network devices will take up a forwarder role. In some examples, the performance score (PS) can be determined based on equation-1 represented below.

$$PS = (\text{avail.processing power} * \alpha) + (\text{device score} * \beta) + (\text{device stability} * \gamma) + (\text{balance val.} * \delta) + (\text{MAC val.} * \varepsilon) \qquad (1)$$

Each performance parameter may have a weight when determining the performance score. Equation-1 has a defined weight for each performance parameter (i.e., $\alpha$, $\beta$, $\gamma$, $\delta$, and $\varepsilon$). Certain performance parameters, such as available processing power and device score may have a higher weight. A performance parameter such as MAC value may have a lower weight. A MAC value may be used to a tie-break when two or more network devices have similar performance parameters or computed performance scores. In an example, weight can be as $\alpha=35\%$, $\beta=25\%$, $\gamma=20\%$, $\delta=15\%$, and $\varepsilon=5\%$. Weight may be modified to suit a particular application or based on deployment. In some additional examples, the weight may be varied such that a performance parameter that may be significant for a network installation can be provided with a higher weight.

Further, the processor 255 may fetch, decode, and execute instructions 264 that cause the processor to broadcast the computed performance score of the network device 206A to other network devices 206B and 206C. In some instances, the performance score may be broadcasted in the form of an Ethernet frame, which is discussed in the illustrative example of FIG. 3.

The processor 255 may fetch, decode, and execute instructions 266 that cause the processor 255 to receive one or more computed scores from other network devices 206B and 206C. For example, the network devices 206A-206C send a multicast message or an announcement comprising their respective performance to the switch 204. The switch 204 may duplicate and send the multicast message to other network devices in that particular VLAN.

The processor 255 may fetch, decode, and execute instructions 268 that cause the processor 255 to compare its computed performance score with the received performance scores. In some examples, the instructions 268 may further include instructions to retrieve the performance score received from a Performance Score Ethernet frame received from a particular network device. The retrieved performance score may be compared with its computed performance score.

The processor 255 may fetch, decode, and execute instructions 270 that cause the processor 255 to continue to operate in the forwarder mode based on a determination that the received performance scores are less than its computed performance score. In other words, network device 206A determines that it has the highest performance score in the VLAN and therefore, continues to operate in forwarder mode. Other network devices (e.g., the network device 206B and 206C) that are initially configured to operate in forwarder mode, modify their operational mode to non-forwarder or backup-forwarder.

The processor 255 may fetch, decode, and execute instructions 272 that cause the processor 255 to receive mDNS packets from other network devices of the plurality of network devices. In some examples, the central service 250 is configured to receive the mDNS packets transmitted over the network installation 200. For example, the mDNS packets may include, but are not limited to, request(s) for one or more services by one or more client devices, advertisement(s) related to one or more services offered by a device (e.g., a printer, a television, a projector, etc.) that are part of the network installation 200, or the like.

The processor 255 may fetch, decode, and execute instructions 274 that cause the processor 255 to communicate the received mDNS packets to the central service 250. The central service 250 may include a database storing distributed layer-two services related information (e.g., requests and advertisements). In some examples, the central service 250 may be a controller disposed on-premise. In some examples, the instructions 274 may include further instructions that cause the processor to handle data and/or management functions with client devices and/or other network devices in the network installation.

Initially, all of the network devices 206A-206C may operate in forwarder mode such that they can forward mDNS packets to the central service 250. As discussed above, the network devices 206A-206C may exchange performance scores. Based on a comparison of the performance scores, a network device may determine that its performance score is greater than the performance scores that it has received and may continue forwarder mode operation. Other network devices that receive one or more performance scores higher than their computed performance score may demote their mode, for example, a backup-forwarder mode or non-forwarder mode. The network device operating in forwarder mode sends any mDNS packets that it receives to the central service. Other network devices that are demoted from forwarder mode may drop the mDNS packets that they receive. In some examples, the performance scores, VLAN information, central service information, etc. are communicated via a custom Ethernet frame, which is elaborated subsequently.

Figure 3:
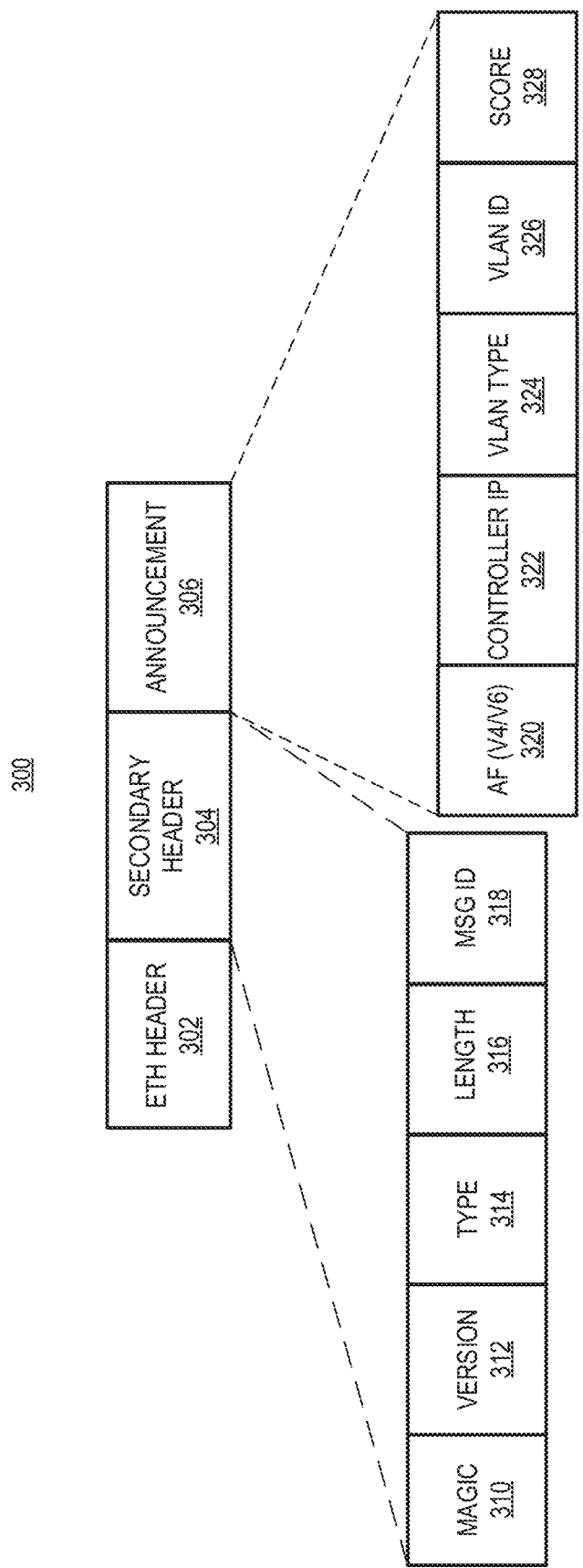
FIG. 3 depicts a schematic view of an example performance score Ethernet frame, as per the present disclosure.

FIG. 3 illustrates a schematic view of a Performance Score Ethernet frame 300 in accordance with certain examples of the present disclosure. The Performance Score (PS) Ethernet frame 300 may be generated by one network device and can be transmitted to other network devices. The PS Ethernet frame 300 discussed herein may be based on (e.g., in structure, content, or usage) on an Ethernet frame as described in the IEEE 802.3 standard. The PS Ethernet frame 300 may include an Ethernet header 302, a secondary header 304, and an announcement 306. The Ethernet header 302 may include a source MAC address field and a destination MAC address field. The secondary header 304 and the announcement 306 may be custom fields defined by a network administrator. The secondary header 304 may further include a magic field 310, a version field 312, a type field 314, a length field 316, and a message ID (MSG ID) 318. The announcement 306 may include an Address Family (AF) 320, a controller IP address 322, a VLAN type 324, a VLAN ID 326, and a score field 328.

In some examples, the magic field 310 may be an identifier for identifying a message type. The magic field 310 may be a numerical or text value used to identify the message type or protocol. The version field 312 may indicate a version of the announcement. Different versions may have a different field for the secondary header 304 and the announcement 306. The type field 314 may indicate that an announcement message is being communicated through the PS Ethernet frame 300. The length field 316 may indicate the length of the announcement packet. The message ID 318 may indicate an identification of a particular announcement that it is part of the PS Ethernet frame 300. The address family field 320 may specify whether the address is an IPv4 or IPv6 type. The controller IP field 322 may indicate the address of the central service (e.g., the central service 250 of FIG. 2) to which mDNS packets can be sent. The VLAN type 324 may indicate a VLAN tag type (e.g., 0x8100 or similar VLAN type field). The VLAN ID field 326 may indicate a working VLAN to which the source device belongs. The score field 328 may indicate a performance score of the source access point. The performance score can be computed based on a set of performance parameters.

Figure 4A:
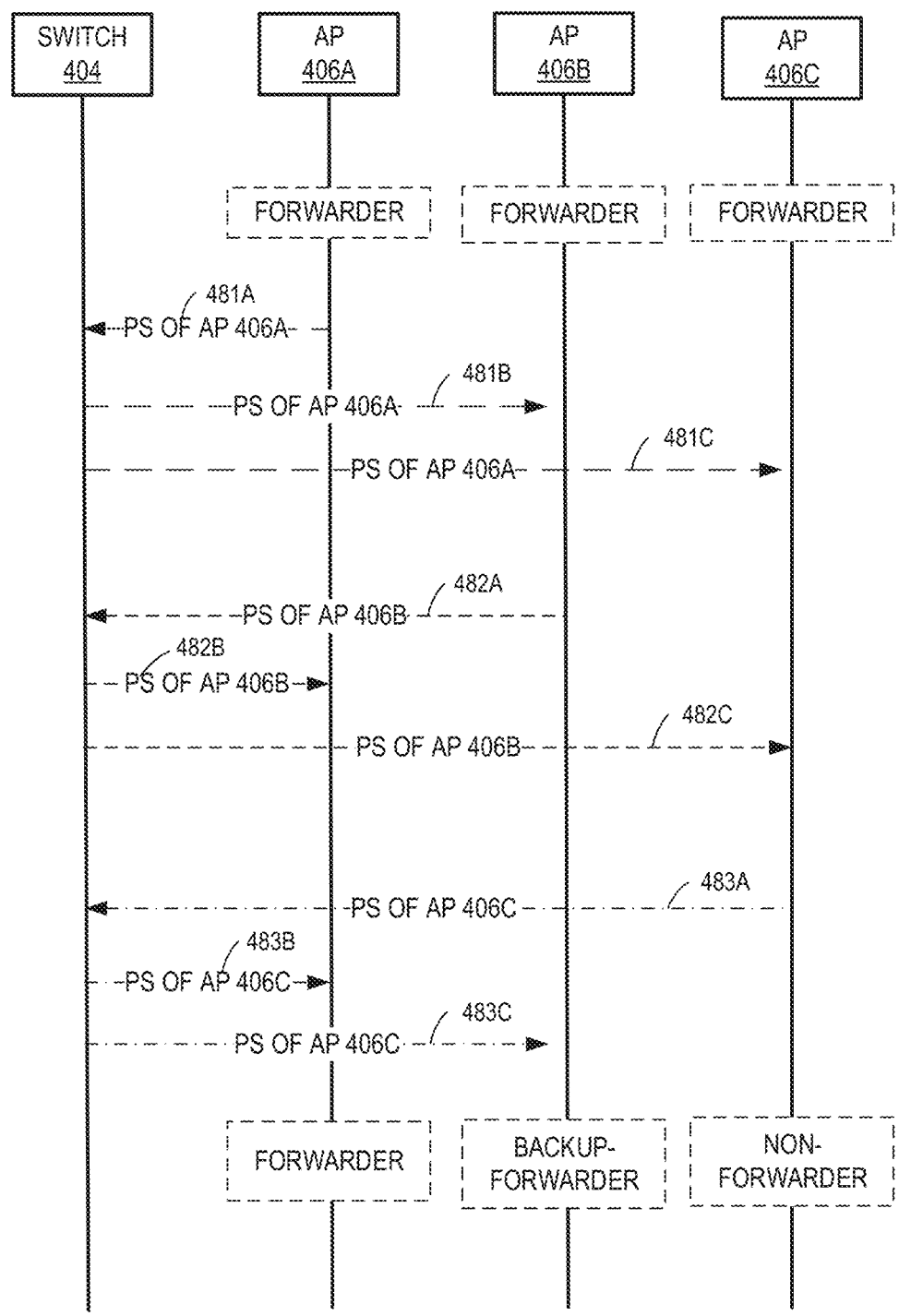
FIG. 4A depicts a schematic view of a packet sequence of multicast messages exchanged among network devices in a network installation, as per the present disclosure.

FIGS. 4A & 48 illustrate a schematic view of a packet sequence exchanged among network devices in a network installation, according to some examples of the present disclosure. The illustrative example shown corresponds to an exchange of performance score Ethernet frames (e.g., the PS Ethernet frame of FIG. 3) among the network devices, and forwarder and backup-forwarder. The schematic view illustrates forwarder and backup-forwarder modes assignment. The illustrative example of FIG. 4A comprises a switch 404, a first access point 406A, a second access point 406B, and a third access point 406C. The access points 406A-406C form part of a VLAN configuration by virtue of the configuration of ports of the switch 404 to which they are connected to. As discussed earlier, initially all the access points 406A-406C operate in forwarder mode.

Each of the access points 406A-406C computes its performance score based on a set of performance parameters. The performance parameters may include/based on the availability of free processing power, a hardware configuration of an access point, a communication capability of an access point, a stability of access point, a mode of an access point in other VLANs, and other similar performance metrics. For example, the first access point 406A computes its performance score and communicates the performance score 481A via a multicast message (e.g., the performance score Ethernet frame 300) to the switch 404. The switch 404 may receive the multicast message at an uplink port to which the first access point 406A may be coupled to. The switch 404 may duplicate the multicast message and communicate the multicast message 481B, 481C to other network devices, such as the second access point 406B and the third access point 406C. Similarly, the second access point 406B and the third access point 406C compute their performance scores and communicate them 482A, 483A to the switch 404. The switch 404 may duplicate the messages that it has received and communicate them 482B, 482C, 483B, 483C to other access points.

Each access point 406A-406C may compare its computed performance score with the received performance scores that correspond to other access points. In the illustrative example, the first access point 406A may have the highest performance score, followed by the second access point 406B and the third access point 406C. For example, the first access point 406A may compare its performance score with the performance scores of the second access point 406B and the third access point 406C. In response to a determination that each of the received performance scores are less than its computed performance scores, the first access point 406A may continue to operate in forwarder mode.

Similarly, the second access point 406B may, in response to a determination that one of the received performance scores is greater than its computed performance score, modify its operational mode from forwarder mode to a backup-forwarder mode. The backup-forwarder 406B may take over as the forwarder for mDNS communication to central service when the forwarder 406A is down. In some other instances, such as a fresh evaluation of APs for mode selection, the backup-forwarder may temporarily take up the role of forwarding mDNS packets till the time a new AP assumes the forwarder mode of operation.

Further, in response to a determination that two or more received performance scores are greater than its computed performance score, the third access point 406C may modify its operational mode to a non-forwarder mode.

Figure 4B:
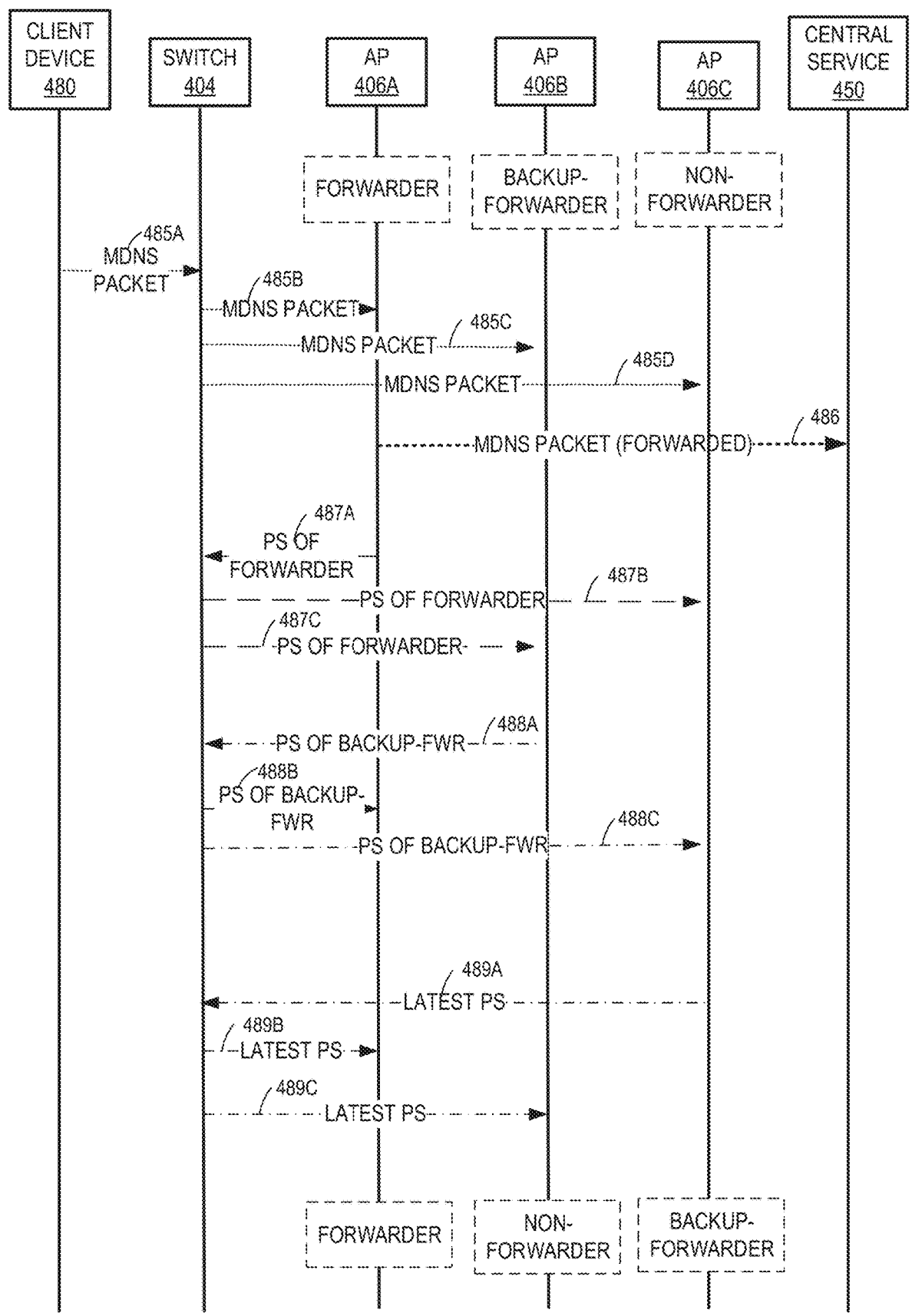
FIG. 4B depicts another schematic view of packet sequence of multicast messages in a network installation, as per examples of the present disclosure.

Now referring to illustrative example of FIG. 4B, when a client device 480 communicates a multicast message (e.g., mDNS packet) 485A to the switch 404, the multicast message may be communicated 485B-485D to the access points 406A-406C in the VLAN deployment. The first access point 406A that is operating as a forwarder further forwards the multicast message (e.g., mDNS packet) 486 to the central service 450. In certain examples, the central service 450 may receive multicast messages transmitted over the network from a source mDNS device (e.g., the client device 480). These multicast messages may correspond to an advertisement of services offered by a device or messages requesting services identified. The access points 406B and 406C may drop the mDNS message received from the switch 404.

Further, each access point 406A-406B may periodically compute its performance score. The latest values of the set of performance parameters can be considered for the computation of the performance scores. The computation of the performance scores can be performed at a first interval. Further, the access points (e.g., APs 406A and 406B) that are operating in forwarder mode and backup-forwarder mode, periodically, broadcast 487A-487C, 488A-488C their latest performance scores. The broadcasting of the performance scores by the forwarder and the backup-forwarder may be at a second interval. In certain examples, the first interval may be set to be greater than the second interval. In other words, the frequency at which performance scores can be broadcasted by the forwarder and the backup-forwarder may be greater than the frequency at which the performance scores are computed. Thus, the second interval may be set for optimal usage of processing power for performance score computation. Further, broadcasting of performance scores by the forwarder and the backup-forwarder may be used to determine the operating state of the respective access points. For example, a back-forwarder may determine that the forwarder has gone down if it fails to receive the performance score from the forwarder. In some other examples, at least one of the first interval and the second interval may be dynamically modified depending on one or more of the performance parameters.

In the ongoing examples, the access point 406C may receive PS Ethernet frame from the APs 406A and 406B after the first interval. The access point 406C may compare the computed performance score it has received from the APs 406A and 406B. In response to a determination that one or more (i.e., both in the ongoing example) of the performance scores are less than its latest performance scores, the access points 406C may modify its operational mode. For example, if the performance score received from the access point 406B is less than the performance score of the access point 406C, then the access point 406C announces/broadcasts its performance score 489A and modifies its operational mode to backup-forwarder mode. Upon receiving, the performance score 489B, 489C from the access point 406C, the forwarder and backup-forwarder compare the received performance score with their latest (computed) performances score. For example, the access point 406B may modify its operational mode to non-forwarder if the received performance score is greater than its latest performance score. Similarly, the access point 406C may modify its operational mode to the backup-forwarder mode. In some instances, the access point 406A may continue to operate as a forwarder if it still has a latest performance score greater than the latest performance score received from the backup-forwarder and no other network device has announced its latest performance score. Accordingly, the roles of the access points can be changed dynamically, based on performance scores computed periodically. In other instances, if both the (latest) performance scores received from the access points 406A and 406B are less than the latest performance score of the access point 406C, then it can broadcast/announce its latest performance score and modify its operational mode to forwarder mode. The access points with the second highest performance scores may take the role of backup-forwarder.

In certain VLAN deployments with more than three access points, two or more access points may have their latest performance score greater than the performance score received from a current forwarder and a backup-forwarder. Then, those access points may undergo a selection process to modify their operational mode to forwarder and backup-forwarder based on the steps/blocks discussed herein.

In certain Zeroconf environments, multiple network devices, for example, hundreds or thousands of access points, may be deployed in a network installation. Typically, these access points may send mDNS packets to the central service with service-related requests/advertisements. By selecting a single access point within the network installation to forward mDNS packets to the central service, and employing techniques to ensure that the selected access point is available and efficient, the quantity of redundant mDNS packet traffic on the network can be significantly reduced. Thus, flooding of the network with mDNS traffic, which consumes network resources, is reduced. A PS Ethernet frame (e.g., the PS Ethernet frame 300) may be sent by a forwarder and a backup-forwarder at a predetermined period, such that a limited amount of network resources are utilized. Further, an access point with higher/highest performance score may be selected to operate as a forwarder to send mDNS packets to the central service. Thus, the redundant transmission of mDNS packets to the central service is avoided and the mDNS packets are efficiently handled by the selected network device.

Figure 5:
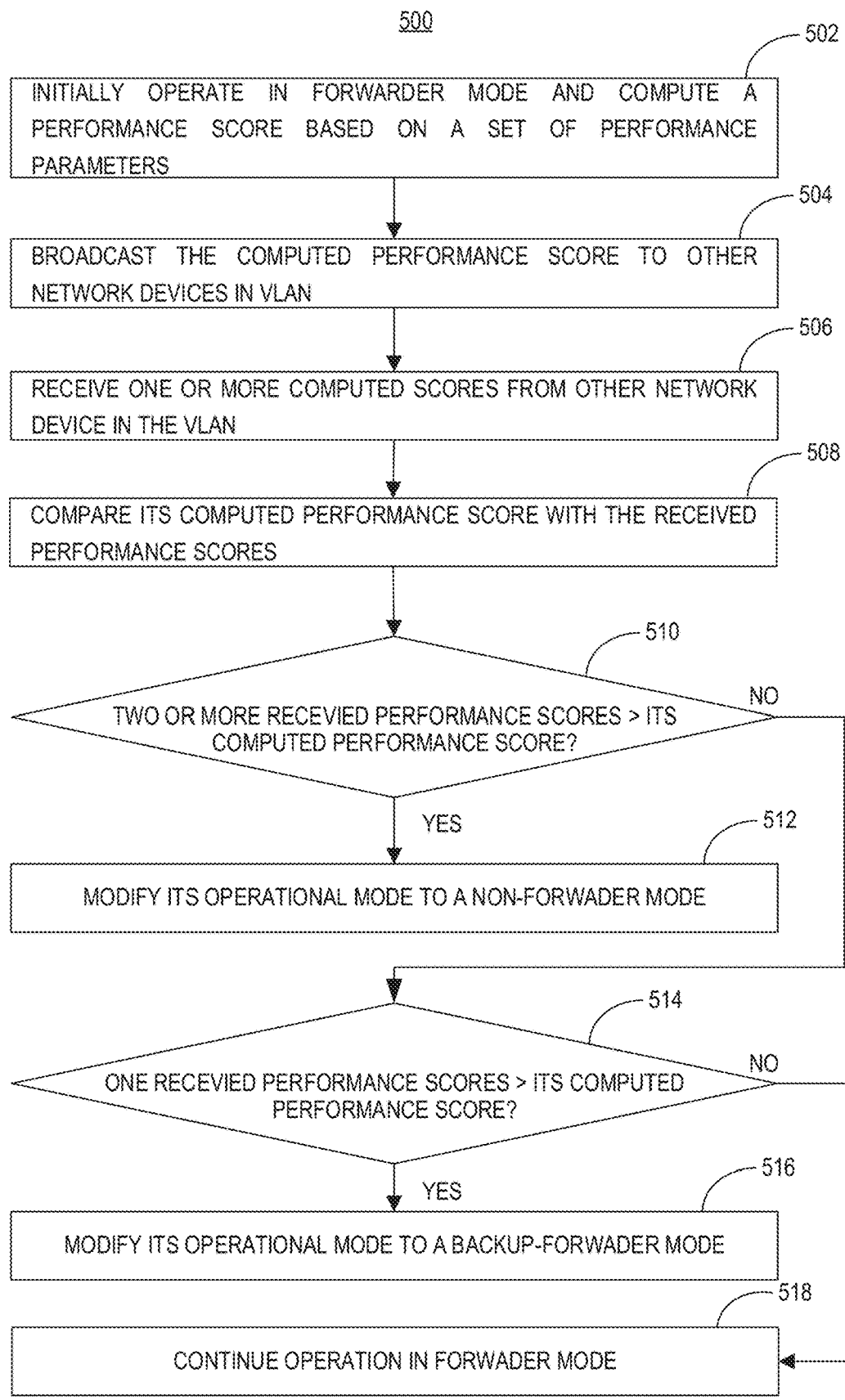
FIG. 5 illustrates a flow diagram illustrating a method of forwarder selection in a Virtual Local Area Network deployment, according to examples of the present disclosure.

FIG. 5 illustrates a flowchart of an example method 500 for a forwarder mode selection is presented. The method 500 may be performed by an Access Point (AP) in a VLAN deployment, for example, the primary site 102 of FIG. 1. In some other examples, the VLAN deployment may correspond to the remote sites 132, 142 each having two or more APs and with a Zeroconf capability. Accordingly, for non-limiting illustration, in the description of method 500, an AP may be considered to be the first AP 106A, 406A, or first network device 206A respectively of FIG. 1, 4, or 2.

Although the blocks in FIG. 5 are shown in an order, the order of blocks shown in FIG. 5 should not be construed as exhaustive. The blocks may be performed at any time, in any order. Additionally, one or more blocks may be repeated or omitted as needed. For illustration purposes, the example method 500 is described as being performed by a network device, such as an access point. Each network device (e.g., access point) in a VLAN deployment may perform the blocks for the selection of a forwarder. In certain examples, the network device may be a hardware processing resource capable of retrieval and execution of instructions stored in a machine-readable storage medium (not shown).

At block 502, the access point may initially operate in a forwarder mode. The access point may compute a performance score based on a set of performance parameters. In certain examples, a performance score may be computed based on example equation (1) as discussed in FIG. 2.

At block 504, the access point may broadcast its computed performance to other network devices that are present in the VLAN. In one example, the access point may prepare a Performance Score Ethernet frame (e.g., the PS Ethernet frame 300 as illustrated in FIG. 3). The access point may be communicatively coupled to an Ethernet switch. The PS Ethernet frame may be broadcasted to the switch, which then communicates to other access points in the VLAN. If an AP from a different VLAN receives the PS Ethernet frame(s), then it may drop those particular frames.

At block 506, the access point may receive one or more performance scores corresponding to other network devices in the VLAN. As other access points in the VLAN may compute their respective performance score and broadcast to other access points.

At block 508, the access point may compare its computed performance score with the received scores. The access point may compare the computed performance score (e.g., numerical value) with those numerical values (i.e., the received performance scores) that have been received from the other access points that are part of the same VLAN. The received performance score is associated with a corresponding access point that communicated it via a PS Ethernet frame.

At block 510, the access point may determine whether two or more received performance scores are greater than its computed performance score. In some examples, the access point may suspend further comparison of performance scores when two of the received performance scores are greater to save processing power and to allocate resources for handling data and management packets.

At block 512, based on a determination that two or more received performance scores are greater than its computed performance score, the access point may modify its operational mode to a non-forwarder mode. Upon modifying operational mode to a non-forwarder mode, the access point may drop any mDNS packets received from client devices and may update its mDNS cache IP address and corresponding hostnames, if required.

Further, if two or more received performance scores are not greater than its computed performance score ('NO' condition at block 510), the access point may determine whether one of the received performance scores is greater than its computed performance score, which is at block 514.

At block 516, based on a determination that one of the received performance scores is greater than its computed performance score, the access point may modify its operational mode to a backup-forwarder mode. In some examples, an access point operating in backup-forwarder mode may communicate the mDNS packets to the central service during a mode change of a current forwarder. The backup-forwarder may take responsibility to transfer mDNS packets during a round for the selection of modes.

At block 518, if none of the received performance scores are greater than its computed performance score ('YES' condition at block 514), the access point may continue its mode in forwarder mode.

Figure 6:
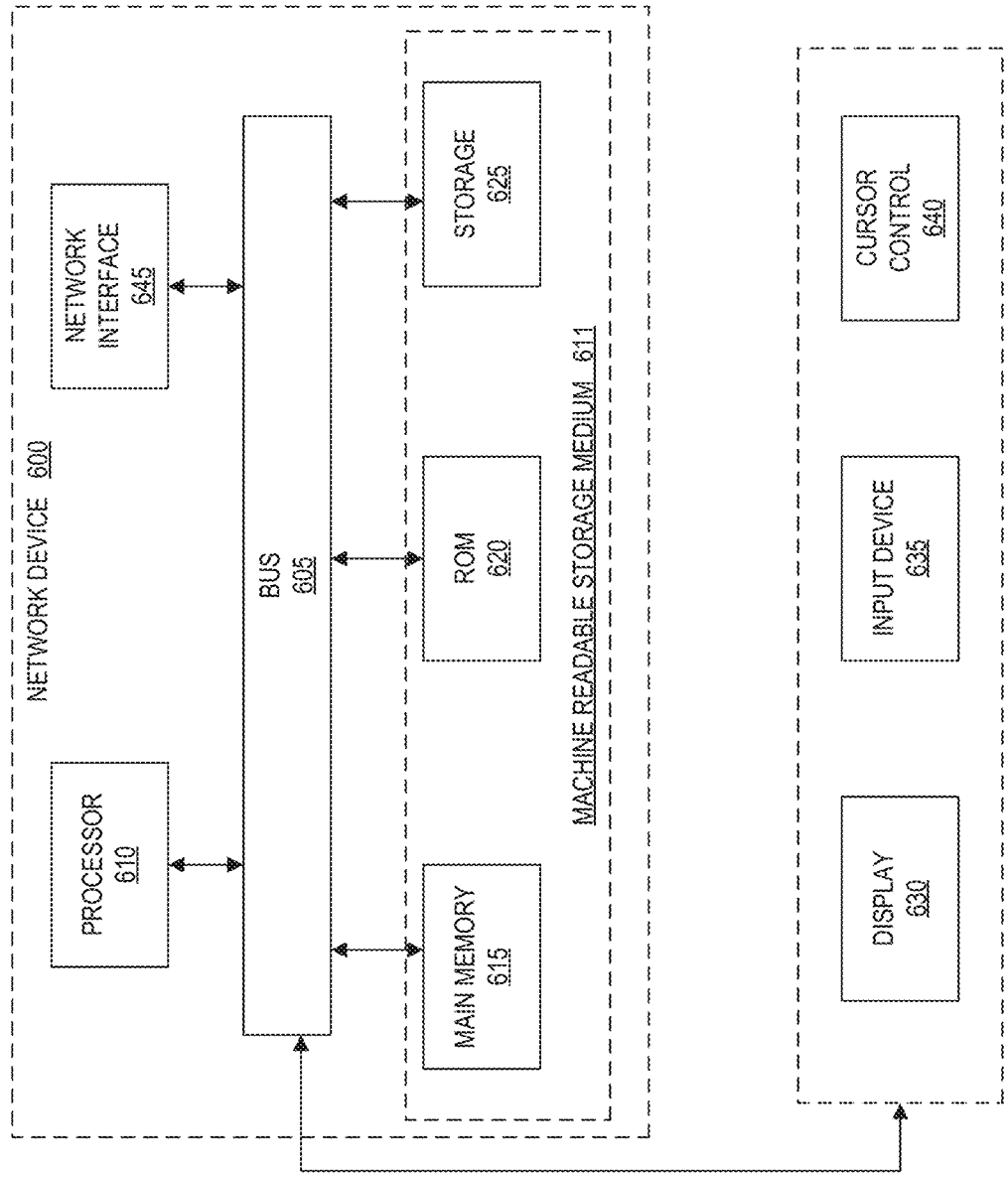
FIG. 6 depicts a block diagram of an example network device in which various of the examples described herein may be implemented.

FIG. 6 depicts a block diagram of a network device 600 in which various of the examples described herein may be implemented. The network device 600 may include a bus 605 or other communication mechanisms for communicating information, a hardware processor, also referred to as processor 610, coupled to the bus 605 for processing information. The processor 610 may be, for example, one or more general-purpose microprocessors.

The network device 600 may also include a machine-readable storage medium 611 communicatively coupled to the bus 605. In some examples, the machine-readable storage medium 611 may include a main memory 615, such as a random access memory (RAM), cache, and/or other dynamic storage devices, coupled to the bus 605 for storing information and instructions to be executed by the processor 610. The main memory 615 may also be used for storing temporary variables or other intermediate information during the execution of instructions to be executed by the processor 610. Such instructions, when stored in storage media accessible to the processor 610, render the network device 600 into a special-purpose machine that is customized to perform the operations specified in the instructions.

The machine-readable storage medium 611 may further include a Read-Only Memory (ROM) 620 or other static storage device coupled to the bus 605 for storing static information and instructions for the processor 610. Further, in the machine-readable storage medium 611, a storage device 625, such as a magnetic disk, optical disk, or Universal Serial Bus (USB) thumb drive (Flash drive), etc., may be provided and coupled to the bus 605 for storing information and instructions.

Further, in some implementations, the network device 600 may be coupled, via the bus 605, to a display 630, such as a Liquid Crystal Display (LCD) (or touch-sensitive screen), for displaying information to a computer user. In some examples, an input device 635, including alphanumeric and other keys (physical, or software generated and displayed on touch-sensitive screen), may be coupled to the bus 605 for communicating information and command selections to the processor 610. Also, in some examples, another type of user input device may be a cursor control 640, such as a mouse, a trackball, or cursor direction keys may be connected to the bus 605. The cursor control 640 may communicate direction information and command selections to the processor 610 for controlling cursor movement on the display 630. In some other examples, the same direction information and command selections as cursor control may be implemented via receiving touches on a touch screen without a cursor.

In some examples, modules may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer-readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an Erasable Programmable Read-Only Memory (EPROM). It will be further appreciated that hardware components may be comprised of connected logic units, such as gates and flip-flops, and/or may be comprised of programmable units, such as programmable gate arrays or processors.

The network device 600 may implement the techniques described herein using customized hard-wired logic, one or more application-specific integrated circuits (ASICs), or Field Programmable Gate Arrays (FPGAs), firmware, and/or program logic which may cause or program the network device 600 to be a special-purpose machine. According to one example, the techniques herein are performed by the network device 600 in response to the processor 610 executing one or more sequences of one or more instructions contained in the main memory 615. The main memory may be part of a machine-readable storage medium 611. Such instructions may be read into the main memory 615 from another storage medium, such as the storage device 625. Execution of the sequences of instructions contained in the main memory 615 causes the processor 610 to perform the process steps described herein. In an alternative example, hard-wired circuitry may be used in place of or in combination with software instructions.

The network device 600 also includes a network interface 645 coupled to bus 605. The network interface 645 provides a two-way data communication. The signals through the various networks and the signals on network link and through the network interface 645, which carry the digital data to and from the network device 600, are examples of forms of transmission media. The network device 600 can send messages and receive data, including program code, through the network(s), network link, and the network interface 645. In the Internet example, a server might transmit a requested code for an application program through the Internet, the ISP, the local network, and the network interface 645. The received code may be executed by the processor 610 as it is received, and/or stored in the storage device 625, or other non-volatile storage for later execution.

In some examples, the machine-readable storage medium 611 (e.g., one or more of the main memory 615, the ROM 620, or the storage device 625) may store instructions which when executed by the processor 610 may cause the processor 610 to execute methods/instructions described in FIGS. 1-4. Some examples instructions which when executed by the processor 610 may cause the processor 610 to compute a performance score based on a set of performance parameters. The instructions may cause the processor 610 to broadcast the computed performance score to other network devices. The instructions may cause the processor 610 to receive performance scores from the other network devices. The instructions may cause the processor 610 to compare the received performance scores with the computed performance score. The instructions may cause the processor 610 to continue operation in the forwarder mode based on the determination that the received performance scores are less than its computed performance score.

In some examples, the network device 600 may be deployed in a network installation with Zeroconf capability.

Accordingly, some of the instructions stored in the machine-readable storage medium 611 may cause the processor 610 to perform a method such as the method 500 described in FIG. 5. Some of the examples instructions which when executed by the processor 610 may cause the processor 610 to broadcast the computed performance score to other network devices. The instructions may cause the processor 610 to receive performance scores from the other network devices. The instructions may cause the processor 610 to compare the received performance scores with the computed performance score. The instructions may cause the processor 610 to continue to operate the forwarder mode based on the determination that the received performance scores are less than its computed performance score.

Each of the processes, methods, and algorithms described in the preceding sections may be embodied in, and fully or partially automated by, code components executed by one or more computer systems or computer processors comprising computer hardware. The one or more computer systems or computer processors may also operate to support the performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, Programmable Logic Arrays (PLAs), Programming Array Logics (PALs), Complex Programmable Logic Devices (CPLDs), FPGAs, logical components, software routines, or other mechanisms might be implemented to make up a circuit. In an implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as the network device 600.

As used herein, the term "or" may be construed in either an inclusive or exclusive sense. Moreover, the description of resources, operations, or structures in the singular shall not be read to exclude the plural. Conditional language, such as, among others, "can," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open-ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent. Further, the term "and/or" as used herein refers to and encompasses any and all possible combinations of the associated listed items. It will also be understood that, although the terms first, second, etc., may be used herein to describe various elements, these elements should not be limited by these terms, as these terms are only used to distinguish one element from another unless stated otherwise or the context indicates otherwise.

What is claimed is:

1. A non-transitory storage medium comprising instructions, the instructions executable by a processor of a network device, to:
   compute, while operating in a forwarder mode, a performance score of the network device in a network installation, wherein the performance score corresponds to an operational performance of network device;
   broadcast the performance score to other network devices in the network installation;
   receive one or more performance scores from the other network devices;
   compare the one or more performance scores that are received with the performance score that is computed;
   continue operation in the forwarder mode based on a determination that each of the one or more performance scores are less than the performance score that is computed;
   receive multicast Domain Name Service (mDNS) packets from one or more client devices; and
   send, while continuing operation in the forwarder mode, the mDNS packets that are received to a central service, wherein the central service stores information corresponding to one or more services associated with the network installation.

2. The non-transitory storage medium of claim 1 further comprises instructions to:
   modify an operational mode to a backup-forwarder mode based on a determination that one of the one or more performance scores is greater than the performance score that is computed.

3. The non-transitory storage medium of claim 1 further comprises instructions to:
   modify an operational mode to a non-forwarder mode based on a determination that at least two of the one or more performance scores are greater than the performance score that is computed.

4. The non-transitory storage medium of claim 1 further comprises instructions to:
   periodically compute the performance score based on a set of performance parameters;
   broadcast a latest performance score to the other network devices; and modify an operational mode to one of a backup-forwarder or a non-forwarder mode, in response to an announcement received from one or more network devices of the other network devices.

5. The non-transitory storage medium of claim 4, wherein the instructions to modify includes further instructions to:
    modify the operational mode to a backup-forwarder mode based on a condition that an announcement is received from a network device of the other network devices; and
    modify the operational mode to a non-forwarder mode based on a determination that two or more announcements are received corresponding to two or more network devices of the other network devices.

6. The non-transitory storage medium of claim 1, wherein the performance score is computed based on a set of performance parameters, wherein the set of performance parameters include at least one of an available processing power, a device score, a stability of device, a balance function offered by device, and a MAC value.

7. An access point comprising:
    a processor; and
    a non-transitory storage medium storing instructions accessible by the processor, wherein the instructions executable by the processor that cause the processor to:
        compute a performance score, while an initial operational mode is set to a forwarder mode;
        broadcast the performance score to other network devices in a Virtual Local Area Network (VLAN) deployment;
        receive one or more performance scores from the other network devices;
        compare the one or more performance scores that are received with the performance score that is computed;
        continue operation in the forwarder mode based on a determination that each of the one or more performance scores that are received are less than the performance score that is computed;
        receive multicast Domain Name Service (mDNS) packets from one or more client devices coupled to the VLAN deployment; and
        send the mDNS packets that are received to a central service.

8. The access point of claim 7, wherein the performance score is based on a set of performance parameters, and the set of performance parameters includes at least one of an available processing power, a device score, a stability of device, a balance function offered by device, and a MAC value.

9. The access point of claim 7, wherein the access point is communicatively coupled to an Ethernet switch, and the access point broadcasts the performance score that is computed to the Ethernet switch.

10. The access point of claim 7, wherein the performance score is embedded in a performance score Ethernet frame generated by the access point.

11. The access point of claim 10, wherein the performance score Ethernet frame includes a controller Internet Protocol (IP) field that corresponds to a central service.

12. The access point of claim 10, wherein the performance score Ethernet frame includes a VLAN ID field that provides information corresponding to a Virtual Local Area Network (VLAN) to which the access point belongs.

* * * * *